Feb. 17, 1925.  1,526,428
G. W. McKEE
PROPORTIONAL MIXER
Filed April 12, 1923    2 Sheets-Sheet 1
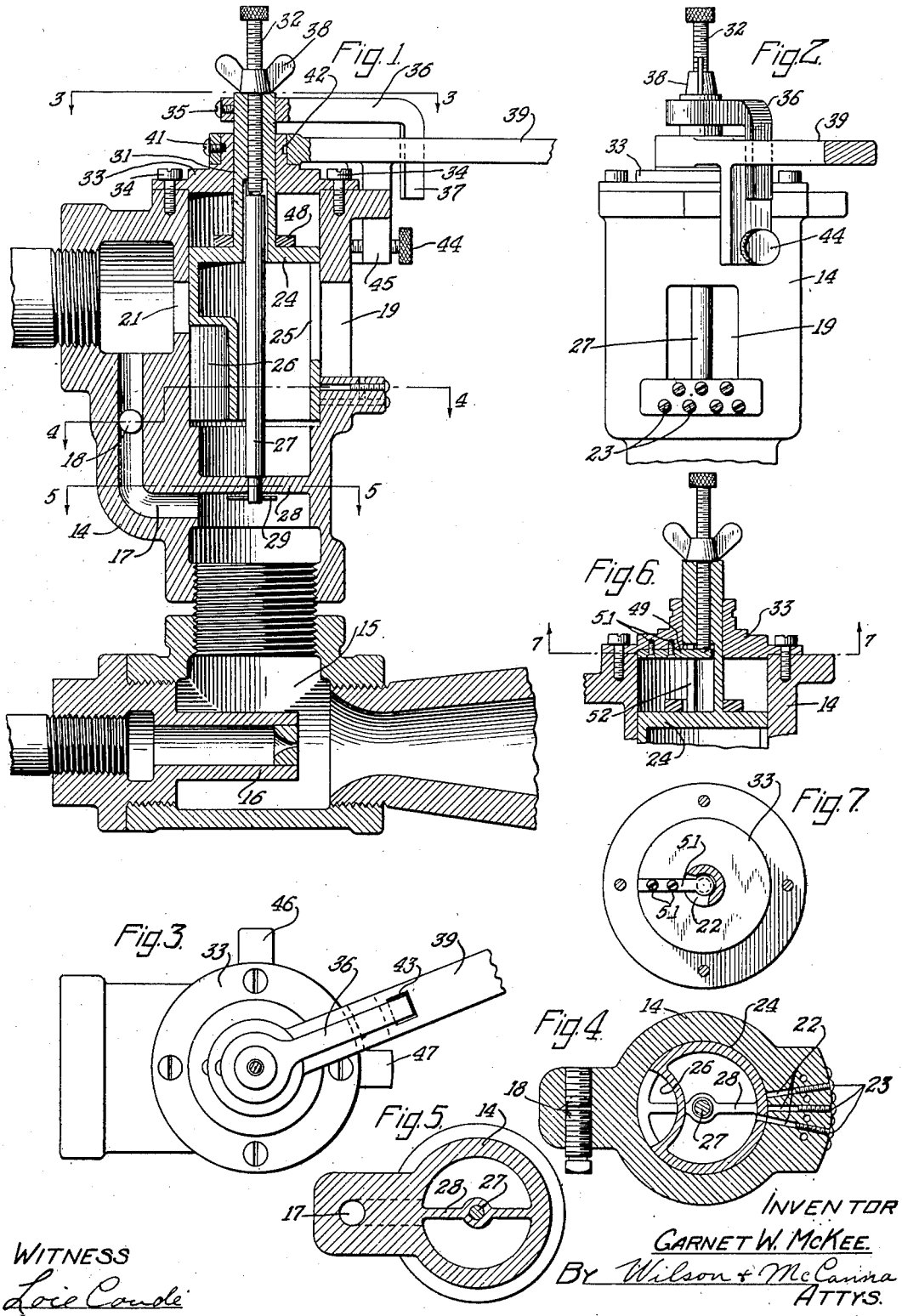
WITNESS
Loie Coudé
INVENTOR
GARNET W. McKEE.
By Wilson & McCanna
ATTYS.

Feb. 17, 1925.  1,526,428
G. W. McKEE
PROPORTIONAL MIXER
Filed April 12, 1923   2 Sheets-Sheet 2
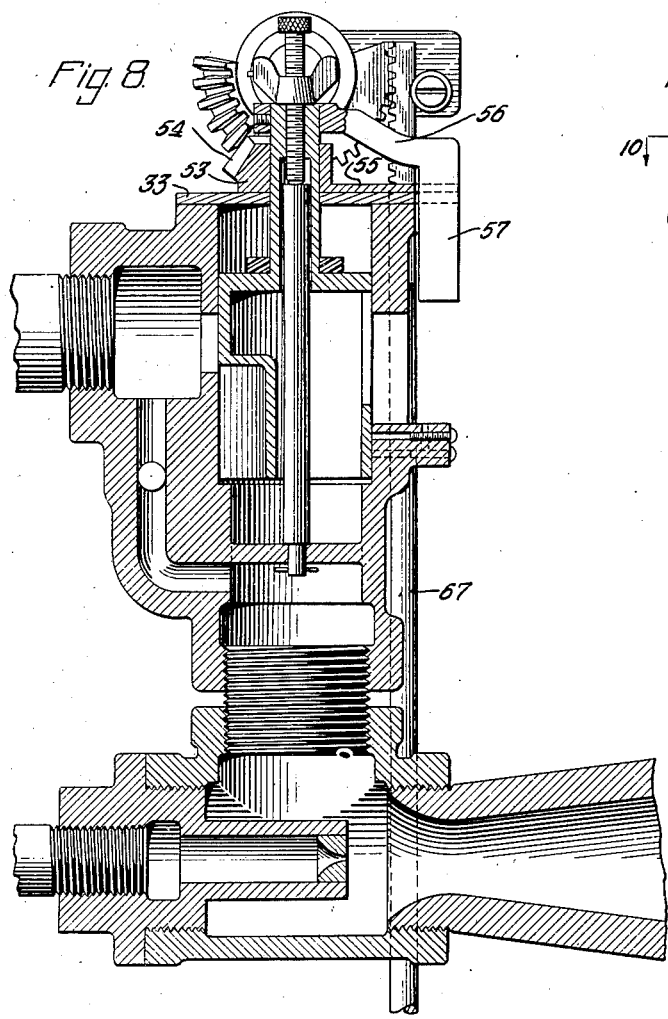
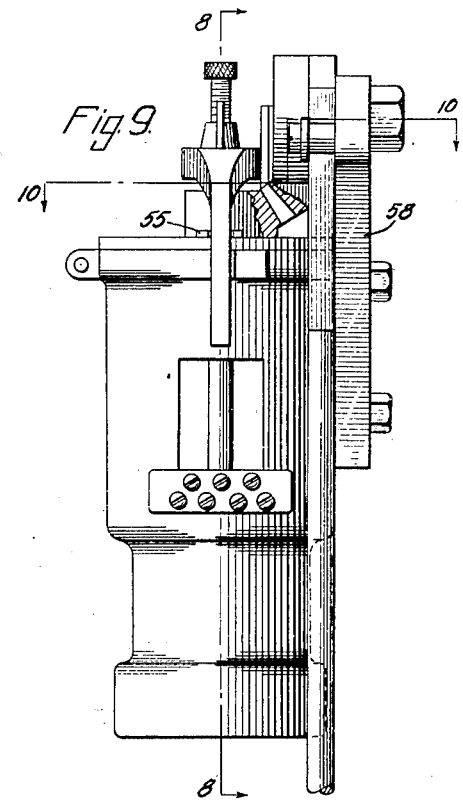
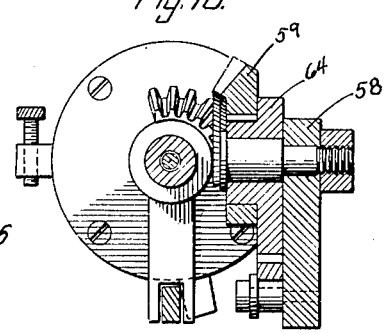
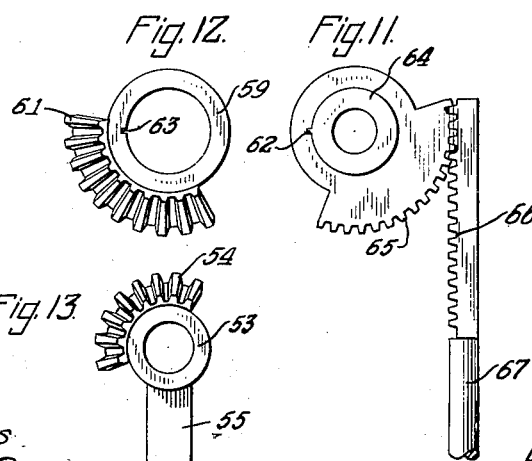
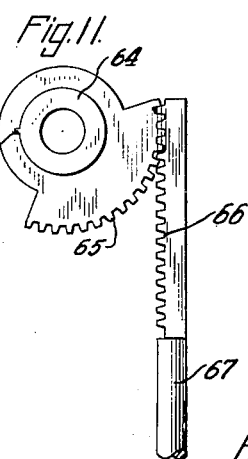
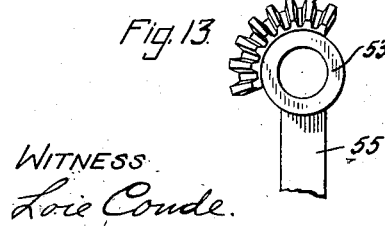
INVENTOR,
GARNET W. McKEE
By Wilson & McCanna
ATTYS.

Patented Feb. 17, 1925.

1,526,428

UNITED STATES PATENT OFFICE.

GARNET W. McKEE, OF ROCKFORD, ILLINOIS.

PROPORTIONAL MIXER.

Application filed April 12, 1923. Serial No. 631,496.

*To all whom it may concern:*

Be it known that I, GARNET W. McKEE, a subject of the King of Great Britain, residing at Rockford, in the county of Winnebago and State of Illinois, have invented certain new and useful Improvements in Proportional Mixers, of which the following is a specification.

This invention relates to mixing valves of the type adapted for proportionally mixing air and gas, or other fuel, to produce a combustible mixture for delivery to burners or other apparatus in which the mixture is consumed.

The present invention aims to improve the general construction and operation of a valve of this type, such as is disclosed in my prior Patent, No. 1,357,294, granted November 2, 1920, and with this end in view, embodies certain novel features of construction which will be later explained more in detail.

One of the primary purposes of this invention is to provide a proportional mixer in which the valve proper will be entirely enclosed, so as to preclude the entrance of dirt and other foreign matter into the casing above the valve proper, which would tend in operation to cause the valve to stick and would also cause the valve to wear rapidly.

Another object is to obviate injury to the operator, occasioned by explosions or flarebacks in the valve casing, which drive the valve proper violently upward in the casing, and if the control handle lever be connected directly with the valve, this lever is also thrown upwardly and might injure an operator who at that time might be adjusting the valve. In my present invention the operating lever is not connected directly with the valve, but is mounted on the valve casing so as to be incapable of upward movement with the valve, a slidable connection between the valve and the lever being provided through which proper adjustments of the valve may be made.

Another object is to support the valve entirely within the casing instead of partially outside thereof, and to support it in such a manner that it is self-centering in the casing and has no tendency to stick or bind in operation.

A further object is to provide a mixer which will be sufficiently strong and rugged to withstand any explosions or other strains to which it may be subjected, and furthermore, my invention contemplates the provision of a buffer adapted to absorb explosion shocks imposed upon the valve, and whereby liability of injury to the valve is materially reduced.

Other objects and advantages of this invention should be readily apparent as the same becomes better understood by reference to the following description, when considered in connection with the accompanying drawings.

Referring to the drawings:

Fig. 1 is a vertical sectional view through a mixer embodying my invention;

Fig. 2 is a fragmentary elevation looking toward the left at Fig. 1;

Fig. 3 is a plan view of the structure shown in Figs. 1 and 2;

Figs. 4 and 5 are sectional views on the lines 4—4 and 5—5 of Fig. 1;

Fig. 6 is a fragmentary sectional view showing a modified form of valve support;

Fig. 7 is a sectional view on the line 7—7 of Fig. 6;

Fig. 8 is a view similar to Fig. 1, showing another form of operating mechanism, this view being taken on the line 8—8 of Fig. 9;

Fig. 9 is a side elevation looking toward the left at Fig. 8;

Fig. 10 is a sectional view on the line 10—10 of Fig. 9; and

Figs. 11, 12, and 13 are details of the valve operating mechanism.

The mixer generally in many of its features is substantially like that disclosed in my co-pending application, Serial No. 563,059, filed May 23, 1922, and the features shown and claimed in said application will be referred to in the present instance generally, and only such parts as are necessary to an understanding of my present invention will be described in detail.

The mixer comprises a casing indicated generally by reference character 14, which may be attached to a centrifugal blower or any other type of mixer proper, the casing in the present instance being shown as connected to a mixing chamber 15, to which air under pressure is delivered through a nozzle 16, and mixed with gas entering through a by-pass 17 controlled by an adjustable valve 18.

The casing is provided with the usual air inlet port 19 and the fuel inlet port 21, and auxiliary air may be supplied through ducts 22 regulated by closure screws 23, all of which features thus far described form the subject matter of my co-pending application, to which reference has previously been made.

Within the casing there is rotatably mounted the valve proper 24, which is generally cylindrical in shape and provided at one side with an air inlet port 25, and at its opposite side with an arcuate inlet fuel passage 26 adapted to register with port 21 in the usual manner. The relative proportions of air and fuel admitted are controlled by vertical adjustments of the valve in the casing, and the quantity of air and fuel admitted is regulated by rotating the valve to open and close the ports.

The valve in the present instance, instead of being supported outside the casing, is supported entirely within the casing upon a supporting member 27, loosely carried at its lower end on a spider 28, to which it is secured against displacement by a pin 29. The upper end of this member projects into the hollow stem 31 of the valve, and is preferably slightly dished to receive the lower end of an adjustable screw 32, threaded longitudinally into the valve stem and by which the valve is rotatably supported upon the upper end of the member 27. Since the member 27 is somewhat loosely carried upon the spider, its upper end is free to move laterally limited distances sufficiently to permit the valve to center itself in the casing, so that it will not stick or bind in operation.

In order to prevent the entrance of dirt and other foreign matter into the upper end of the casing above the valve, where it would cause the valve to stick and bind, and wear rapidly, the upper end of the casing is sealed by a closure in the form of a plate 33, secured by bolts 34, or other means, to the casing. The valve stem projects upwardly from this closure and near its upper end has secured thereto by set screw 35 an operating arm 36, which projects radially from the stem and has its outer end turned downwardly, as indicated at 37. Vertical adjusting movements of the valve to regulate the relative proportions of air and fuel admitted through the ports, is effected by adjustment of the screw 32, which is then locked in adjusted position by a lock nut 38.

In the event of flare-backs or explosions with the casing, the valve is forced violently upwardly in the casing, and in order that such movement may not injure an operator who may be adjusting the valve, the adjusting handle or lever 39 is rotatably mounted upon the casing closure 33, where it is held against displacement by a screw 41 engaged in a groove 42, formed in the central upward extension of the casing. An operative connection between the lever 39 and the operating member 36 is established by providing the lever with an opening 43 through which the downturned end 37 of the member projects, thereby forming a lost motion connection between the lever and member, which permits vertical movements of the member with the valve without transmitting such movements to the lever, and without disturbing the operative connection. By rotating the lever 39, the valve may be rotatably adjusted to regulate the quantity of fuel and air admitted, and the valve may be locked in adjusted position by a set screw 44 threaded through an arm 45 depending from the lever 39, the set screw being adapted to engage the perimeter of the mixer casing. Abutments 46 and 47, projecting radially from the casing in the path of movement of the arm 45, limit the rotative movements of the valve.

For the purpose of absorbing the shocks incident to violent upward movements of the valve under the influence of explosions in the casing, I prefer to mount upon the top of the valve a buffer or cushion member 48, preferably in the form of a rubber ring surrounding the valve stem and adapted to engage the top of the casing upon upward movement of the valve, so as to prevent a metal to metal contact between the valve and the closure top.

In Figs. 6 and 7 I have shown a modified structure for supporting the valve, comprising a supporting member 49, secured by screws 51 in a groove formed in the under face of the closure 33, this member projecting radially into the hollow valve stem, which for the purpose of receiving the member has a portion thereof cut away, as indicated by 52, thereby permitting the valve to partake of the desired rotative movements. This member 51 performs the function of the supporting member 27, previously described, and in all respects this valve is substantially similar in operation to that shown in Fig. 1 and previously described.

The control lever 39, by which the valve is opened and closed, described in connection with Fig. 1, is intended for manual manipulation, but in some instances it is desirable that the valve be automatically opened and closed to maintain a predetermined temperature. For instance, a thermostatic element may be arranged to control the admission of gas under pressure beneath the diaphragm, which is adapted to rise and fall with the fluctuation of pressure, as illustrated in my prior Patent No. 1,312,369 issued Aug. 12, 1919.

In order to illustrate the application of my present mixer to a system of this character, I have shown in Figs. 8 to 13, inclusive, a form of operating mechanism by which such mixer may be automatically controlled. Referring now to these figures of the drawings, it will be observed that I have mounted above the closure plate 33 a hub 53 provided with a bevel gear sector 54, and a radially projecting arm 55, which is bifurcated at its outer end, projecting beyond the perimeter of the valve casing. Upon the stem of the valve there is mounted an operating member 56, having a downturned portion 57 projecting through the bifurcation in the arm 55, so that the rotative movements of the arm will be imparted through the member 56 to the valve stem.

Upon a bracket 58, fixed to the side of the casing, there is rotatably mounted a hub 59, also provided with a bevel sector 61 meshing with the sector 54. Keyed to the hub 59 by means of a key 62 and a slot 63 is a second hub 64 carrying a sector 65 which meshes with a vertically disposed rack 66 carried by a rod 67, the lower end of which may be connected to a diaphragm or other automatically movable actuating member.

As the rod 67 rises and falls, under the control of the thermostatic element, the valve, through the driving sectors described, will be rotated in one direction or the other to automatically open or close the requisite amount to deliver the required quantity of fuel mixture. Should an explosion occur, the valve is free to move upwardly without disturbing the driving mechanism, by reason of the sliding connection between the member 56 and the lever 55.

It is believed that my invention, its mode of operation and many of its attendant advantages will be understood from the foregoing without further description, and it should be manifest that the structural details illustrated and described may be varied within considerable limits, without departing from the essence of the invention, as defined in the following claims.

I claim:

1. A proportional mixer, comprising a casing provided with fuel and air ports, a valve rotatably and slidably disposed within said casing, a valve supporting member disposed within the casing, and means for rotatably and adjustably supporting said valve upon said member.

2. A proportional mixer, comprising a casing provided with fuel and air ports, a valve rotatably mounted in said casing, a closure for the upper end of said casing, a valve supporting member disposed entirely within the casing, and means adjustable from outside said casing for adjusting the longitudinal position of said valve in the casing.

3. A proportional mixer, comprising a casing provided with fuel and air ports, a valve rotatably and slidably disposed within said casing, a closure for the upper end of the casing, a hollow valve stem projecting through said closure, a valve supporting member mounted within the casing and extending into said hollow stem, and an adjustable supporting screw threaded through the upper end of said stem into engagement with said supporting member whereby said valve is rotatably supported.

4. A proportional mixer, comprising a casing, a valve rotatably and slidably disposed therein, a valve supporting member disposed within the casing, a closure for the upper end of the casing, a controlling member rotatable concentrically with the casing but immovable longitudinally of the casing, and a connection between said member and said valve whereby the valve may be rotatably adjusted.

5. A proportional mixer, comprising a casing, a closure for the upper end thereof, a valve rotatably and slidably disposed within said casing and provided with a stem extending through said closure, means carried by the stem whereby the valve may be adjusted longitudinally, a controlling member rotatably mounted on said closure, and means including a lost motion connection connecting said member with said valve whereby the valve may be rotatably adjusted.

6. A proportional mixer, comprising a casing, a valve rotatably mounted therein, a closure for the upper end of the casing, a valve stem projecting through said closure, a controlling member rotatably mounted on said closure, and an arm fixed on the projecting end of said stem and slidably engaging said rotatable member whereby said valve may be rotatably adjusted and longitudinal movements of said valve may take place without affecting said controlling member.

7. A proportional mixer, comprising a casing, a valve rotatably and slidably mounted therein, an arm fixed to said valve, and a rotatable operating member slidably connected with said arm.

8. A proportional mixer, comprising a casing, a closure for the upper end thereof, a valve in said casing having a stem projecting through said closure, a segmental gear rotatably mounted upon said closure, means providing a non-rotatable but longitudinally slidable connection between said gear and said stem, an operating gear meshing with said first mentioned gear, and means for actuating said operating gear.

9. A proportional mixer, comprising a casing, a closure for the upper end thereof, a valve rotatably and slidably mounted within the casing and having a stem projecting through said closure, and controlling means for said valve including a gear slidably but non-rotatably connected with said stem and mechanism for actuating said gear.

GARNET W. McKEE.